United States Patent [19]

Takahashi et al.

[11] Patent Number: 5,059,473
[45] Date of Patent: Oct. 22, 1991

[54] OPTICAL RECORDING MEDIUM AND MANUFACTURING METHOD THEREOF

[75] Inventors: Akira Takahashi, Nara; Michinobu Mieda, Tenri; Yoshiteru Murakami, Nishinomiya; Junichiro Nakayama, Nara; Tomoyuki Miyake, Tenri; Kenji Ohta, Nara, all of Japan

[73] Assignee: Sharp Kabushiki Kaisha, Osaka, Japan

[21] Appl. No.: 308,018

[22] Filed: Feb. 9, 1989

[30] Foreign Application Priority Data

Feb. 15, 1988 [JP] Japan ................................ 63-32123

[51] Int. Cl.⁵ ................................................ B32B 3/00
[52] U.S. Cl. ...................................... 428/162; 369/284; 369/286; 369/288; 428/64; 428/65; 428/76; 428/412; 428/426; 430/945
[58] Field of Search ................... 428/64, 65, 76, 412, 428/426, 913, 162; 430/945; 369/284, 286, 288

[56] References Cited

U.S. PATENT DOCUMENTS

| 4,179,532 | 12/1979 | Soeding ................... | 427/54.1 |
| 4,268,369 | 5/1981 | Barlow et al. ............ | 427/130 |
| 4,363,844 | 12/1982 | Lewis et al. ............. | 428/65 |
| 4,544,443 | 10/1985 | Ohta et al. . | |
| 4,731,620 | 3/1988 | Yabe et al. .............. | 430/270 |

FOREIGN PATENT DOCUMENTS

| 1225467 | 3/1985 | Canada . |
| 0155452 | 9/1985 | European Pat. Off. . |
| 0175408 | 3/1986 | European Pat. Off. . |

OTHER PUBLICATIONS

Reprinted from Applied Optics, vol. 27, pp. 2863-2866, Jul. 15, 1988, "Influence of Birefringence on the Signal Quality of Magnetoopics Disks Using Polycarbonate Substrates" by Akira Takashi, M. Mieda, Y. Murakami, K. Ohta, and H. Yamaoka.

Primary Examiner—Ellis P. Robinson
Assistant Examiner—J. Weddington

[57] ABSTRACT

An optical recording medium, which is used as an optical disc, optical card or the like for optically recording, reproducing, erasing and the like, includes a center substrate having formed on at least one side thereof recesses and/or protrusions. Recording films are formed on both sides thereof and transparent protective plates bonded to these recording films respectively. This arrangement substantially eliminates warping of the substrates constituting the optical recording medium and exfoliation of substrates or the like even when the optical recording medium is subjected to sudden changes in temperature. This optical recording medium demonstrates enhanced optical performance and protective effect. The selecting of the transparent protective plate is simplified because the forming recesses and/or protrusions is not a factor. By producing an optical recording medium utilizing the above features, the carrier-to-noise ratio and isotropy of the medium is improved.

13 Claims, 4 Drawing Sheets

OPTICAL RECORDING MEDIUM AND MANUFACTURING METHOD THEREOF

FIELD OF THE INVENTION

The present invention relates to an optical recording medium such as an optical disk, optical card or the like for optical recording, reproducing, erasing, etc. of information, and the manufacturing method thereof.

BACKGROUND OF THE INVENTION

A common method of manufacturing an optical recording medium for recording, reproducing, erasing etc. on both sides of the recording medium comprises, as shown in FIG. 4(a), the steps of first forming recesses and/or protrusions 2 . . . such as grooves and pits on one side of a transparent substrate 1 and then integrally forming a recording film 3 to cover these recesses and/or protrusions, as shown in FIG. 4(b) to thus form an optical recording substrate 4. Thereafter, as shown in FIG. 4(c), an optical recording substrate 4' is formed in a like way and with their recording films 3 and 3' opposed to each other, the optical recording substrates 4 and 4' are bonded to each other by the use of an adhesive 5, for instance, an ultraviolet ray hardening resin.

The aforementioned substrates 1 and 1' are, however, required to allow transmission of light for recording, reproducing and erasing information and since the recesses/protrusions 2 and 2' . . . have to be formed, there are various conditions or requirements for such substrates 1 and 1'.

For instance, they are required to be (1) transparent; (2) optically isotropic, and in particular, have a small birefringence; (3) flat with little indication of warping or waviness; and (4) easy to form the recesses and/or protrusions. Furthermore, there are various requirements for the substrates 1 and 1' also relating to the recording films 3 and 3': for instance, they are required to have a high resistance to heat if the method of forming the recording films 3 and 3' requires heating, and if the films 3 and 3' are required to be moisture-proof, they are required to have a low moisture permeability and low water absorption.

Recently, therefore, study has been made of the possibility of using as the aforementioned substrates 1 and 1' those of polycarbonate resin made by injection molding (hereinafter called "PC substrate").

Even the aforementioned PC substrate made by injection molding tends to have a high birefringence, and when the recording film 3 is formed thereon to make the optical recording substrate 4, the substrate tends to form a convex warp on the side covered with the recording film 3, as shown in FIG. 5. This warping phenomenon in the optical recording substrate 4 warping on the side covered with the recording film 3 is due to the difference in thermal expansion coefficient between the recording film 3 and the PC substrate 1, and if the temperature is raised at the time of forming the recording film 3, the dimensions of the PC substrate 1 becomes smaller than that of the recording film 3.

Also, when an optical recording medium is made by bonding together the optical recording substrates 4 and 4', such an optical recording medium is constantly subject to some degree of stress. When this optical recording medium is subjected to sudden changes in temperature, exfoliation of the recording film 3 from the substrate 1, or of each substrate 1 and 1' takes place in the optical recording medium, thereby affecting the reliability of the optical recording medium.

SUMMARY OF THE INVENTION

It is a primary object of the present invention to provide a highly reliable optical recording medium, having substrates that are formed to be safe from warping and even when the optical recording medium is subjected to sudden changes in temperature or the like, and without the risk of exfoliation of a recording film, etc., and the manufacturing method thereof.

Another object of the present invention is to provide a optical recording medium which can be manufactured having an emphasis on the optical quality or performance required of a transparent protective plate as well as its protective effect, the carrier-to-noise ratio and optical isotropy, in particular, and manufacturing method thereof.

In order to accomplish the aforementioned objects, the present invention relates to an optical recording medium, comprising a center substrate, of which both sides have at least either has recesses and/or protrusions formed therein, recording films formed on both sides thereof and transparent protective plates covering to these recording films respectively.

The aforementioned center substrate may possibly be an injection-molded sheet of polycarbonate (hereinafter called "PC") resin. It may also be a synthetic resin sheet formed by casting.

Meanwhile, the aforementioned transparent protective plate may possibly be an extrusion-molded sheet of PC resin. It may as well be made of glass.

Further, the aforementioned center substrate and transparent protective plate may be formed of materials similar in thermal expansion coefficient.

Further still, the aforementioned center substrate is an injection-molded PC resin sheet, while the transparent protective plate may be a PC sheet molded by extrusion.

The method of manufacturing the aforementioned optical recording medium comprises the steps of first preparing the center substrate with recesses and/or protrusions formed on at least one side, and after forming the recording films on both sides, bonding the transparent protective plate to the recording films respectively.

In the method of forming recesses and/or protrusions on the center substrate during the manufacturing process of the aforementioned optical recording medium, it is also possible to form recesses and/or protrusions on both sides of the center substrate simultaneously using a pair of stampers attached to the die, at the time the center substrate is formed by injection molding.

Also, for forming recesses and/or protrusions on the center substrate in the process of manufacturing the aforementioned optical recording medium, a method of first sheeting the material by extrusion molding and then placing it between a pair of stampers attached to the dies and pressing from both sides to thereby form recesses and/or protrusions simultaneously is available.

DESCRIPTION OF THE EMBODIMENTS

Figure 1:
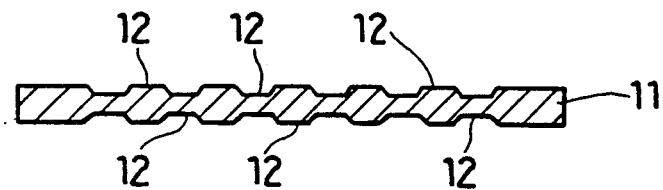
FIG. 1(a) is a vertically-sectioned front view of the center substrate of an optical recording medium having formed on both sides thereof recesses and/or protrusions such as grooves.
FIG. 1(b) is another vertically-sectioned front view of the center substrate of the optical recording medium having formed recording films on both sides thereof.
FIG. 1(c) is still another vertically-sectioned front view of the center substrate of the optical recording medium with recording films formed on both sides thereof and transparent protective layers are bonded to the recording films with a layer of transparent adhesive therebetween.
Figure 1:
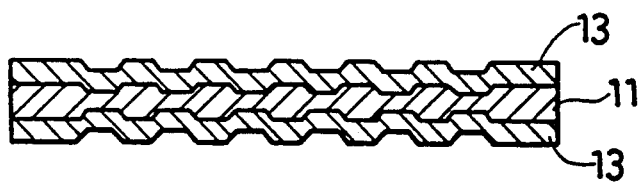
Figure 1:
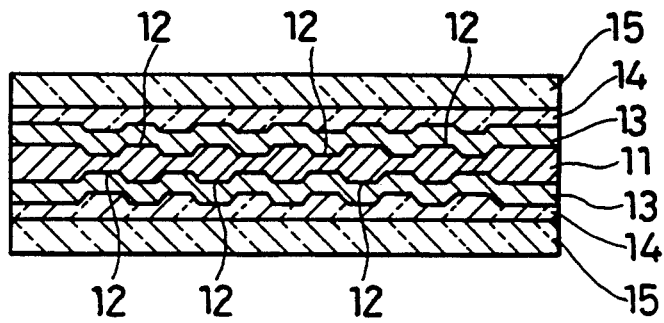

A preferred embodiment of the present invention is described below with reference being made to FIGS. 1 through 3.

In the optical recording medium of the present invention, as shown in FIG. 1(c), a center substrate 11 has formed on both sides thereof recesses and/or protrusions 12 such as grooves and pits and recording films 13 and 13 are formed integrally to cover these recesses and/or protrusions 12. On the recording films 13 and 13 there are formed transparent adhesive layers 14 and 14 and transparent protective plates 15 and 15 are securely bonded thereto.

The process of manufacturing the optical recording medium described above comprises the steps of first forming recesses and/or protrusions 12, as shown in FIG. 1(a), and then forming the recording films 13 and 13 by sputtering etc., as shown in FIG. 1(b).

For the recording films 13 and 13, magneto-optical recording medium films such as a lamination of 4 layers, namely Al/AlN/(Gd$_{0.6}$Tb$_{0.4}$)$_{0.28}$Fe$_{0.72}$/AlN, etc., can be used. Also for example, GdTbFe type, as such, magneto-optical recording medium in film form made of some other material; or even recording medium film of phase change type using Te (type utilizing crystalline-amorphous phase change) can be used.

Then, a transparent adhesive is applied on the aforementioned recording films 13 and 13 to form adhesive layers 14 and 14. The transparent protective plates 15 and 15 are securely bonded thereto. (For the aforementioned adhesive an ultraviolet ray curing resin or the like can be used.)

According to the aforementioned composition, the recording films 13 and 13 are formed on both sides of the center substrate 11. Hence with the recording films 13 and 13 formed on the center substrate 11 warping of the center substrate 11 can be prevented.

Since the recording films 13 and 13 are equal or closely similar in thermal expansion coefficient, they are deemed equal in dimensional change due to changes in temperature. Even if the dimensions of these recording films 13 and 13 should be different from those of the above center substrate 11, the force resulting from this difference in dimensions, acts on the center substrate 11 from both sides thereof at equal magnitudes. If forces of equal magnitudes act on both sides of the center substrate 11, these forces are offset, thereby resulting in no warping of the aforementioned center substrate 11.

As to the aforementioned transparent preventive plates 15 and 15, there is no necessity for forming the recesses and/or protrusions 12. It is, therefore, not necessary to take the ease of formation of recesses and/or protrusions into consideration. Hence, the range of materials to choose from is much increased, thereby enabling selection of materials which emphasize optical performance and protective function required of the transparent protective plate 15.

Although in this embodiment, the recesses and/or protrusions 12 are formed on both sides of the center substrate 11, formation of the aforementioned recesses and/or protrusions 12 can be made by means of a pair of stampers attached to the die(s), in case the center substrate 11 is a polycarbonate (hereinafter called "PC") substrate made by injection molding.

This way, the trouble of doing center alignment of grooves each time can be dispensed with when 2 sheets of optical recording substrate are bonded together. That is, by doing position adjustment of the aforementioned stamper in advance, the center alignment of grooves formed on both sides of the center substrate is easily feasible, and moreover, if this center alignment of grooves is done once, a reproduced center substrate 11 with grooves should to have the identical groove center.

Thus, if the groove's centers can be aligned on both sides, the equilibrium error possibly occurring when the optical recording medium is set on the player and rotated can be easily eliminated or minimized.

It is not always necessary that the aforementioned center substrate 11 be transparent. Material that can be used, besides the aforementioned PC substrate, are ABS resin, melamine resin, glass, or ceramics etc. As to the method of preparing the center substrate 11, extrusion molding or casting etc. are applicable in addition to injection molding. An epoxy resin plate or acrylic resin plate molded by the casting method are well usable as materials for the center substrate 11.

Figure 2:
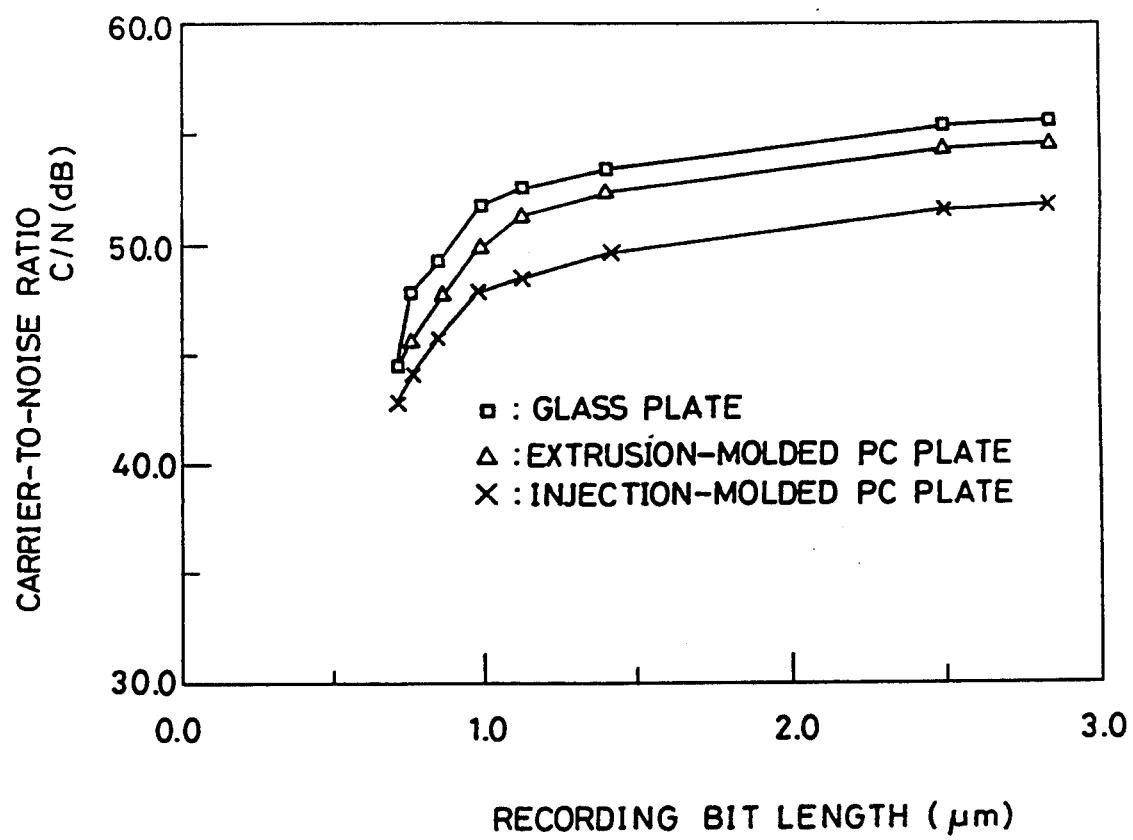
FIG. 2 is a diagram showing the relationship between the length of optical recording bit and the carrier-to-noise ratio for the optical recording medium when a (1) glass base plate is used, (2) extrusion-molded PC (polycarbonate) plate is used, and (3) injection-molded PC plate is used respectively.

The signal quality of the optical recording medium, for instance, the relationship between the recording bit length and the carrier-to-noise ratio was measured using as the aforementioned transparent protective plates 15 and 15 with (1) glass plate, (2) extrusion-molded PC plate and (3) injection-molded PC plate, and the result are shown in FIG. 2.

According to the measured data, the optical recording medium using an extrusion-molded PC plate was comparable with that using a glass plate in carrier-to-noise ratio, with the former turning out to be extremely suited as material of transparent protective plate 15. Meanwhile, the optical recording medium using an injection-molded PC plate was lower in carrier-to-noise ratio than that with glass plate, with the former not necessarily being suitable as the transparent protective plate 15.

Figure 3:
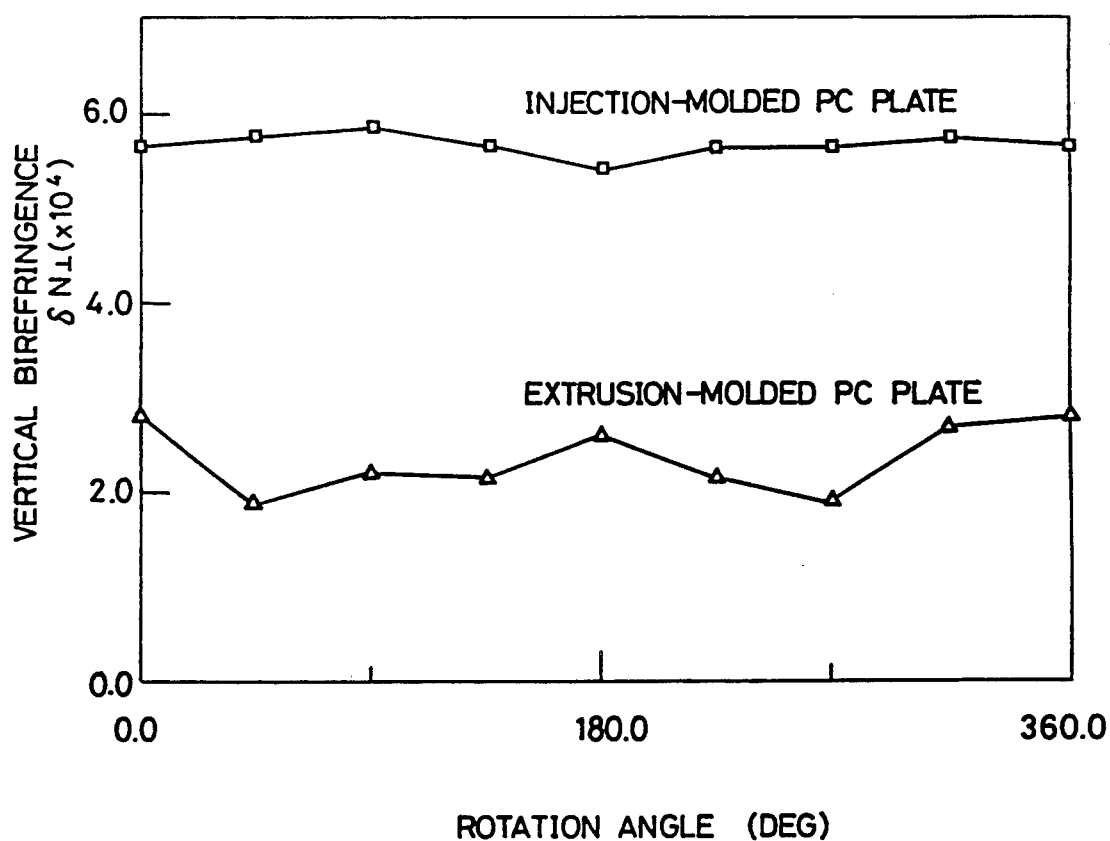
FIG. 3 is another diagram showing the relationship between the rotation angle of the transparent protective plate and the difference in refractive index in the direction along the plate and the direction vertical thereto when (1) extrusion-molded PC plate is used and (2) injection-molded PC plate is used respectively.
Figure 4:
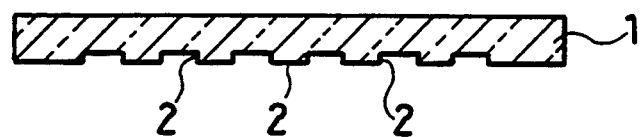
FIG. 4(a) is a vertically-sectioned front view of the substrate of a conventional optical recording medium with recesses and/or protrusions such as grooves formed on one side thereof.
FIG. 4(b) is another vertically-sectioned front view of the substrate of the same conventional optical recording medium with a recording film formed on the side with recesses and/or protrusions.
FIG. 4(c) is still another vertically-sectioned front view showing two bonded-together substrates of the conventional optical recording medium, each substrate having formed thereon a recording film.
Figure 4:
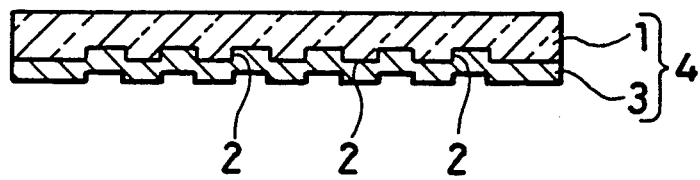
Figure 4:
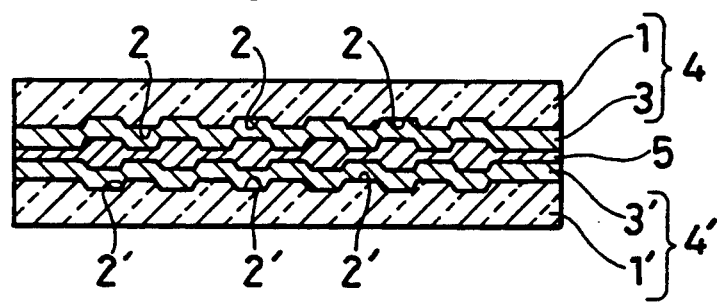
Figure 5:
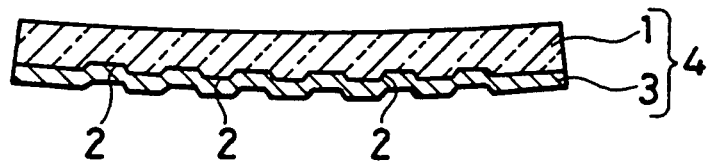
FIG. 5 is a vertically-sectioned front view showing the warped substrate of the optical recording medium.

There is a difference between an extrusion-molded PC plate and an injection-molded counterpart also in refractive index characteristics in the direction along the plate and the direction vertical thereto (hereinafter called "vertical birefringence"), as shown in FIG. 3. That is, an extrusion-molded PC plate is smaller in vertical birefringence, and superior in optical isotropy to an injection molded counterpart. With glass plate birefringence was very noticeable.

Further, there is also a difference between an extrusion-molded and injection-molded PC plates in the ease of forming the recesses and/or protrusions 12, this being attributable to the difference in the method of manufacture. And in this respect an injection-molded PC plate is superior, that is, easier to form the recesses and/or protrusions than an extrusion-molded counterpart.

For the reasons described above, an ideal optical recording medium is obtainable by using an injection-molded PC plate as the center substrate 11 in which the recesses and/or protrusions are formed and by using an extrusion-molded PC plate as the transparent protective plate 15 and 15 which demonstrates superiority in optical isotropy. This disk also shows a desired reduction in inside stress of the optical recording medium because an extrusion-molded PC plate and an injection-molded counterpart are similar in thermal expansion coefficient.

Needless to say, the aforementioned center substrate 11 need not necessarily be an injection-molded PC plate. An extrusion-molded counterpart may be used instead. In order to form the recesses and/or protrusions 12 in an extrusion-molded PC plate the PC plate is placed between a pair of patterned dies and then pressed inward from both sides. When the temperature is kept at approximately 100° C., the aforementioned recesses and/or protrusions 12 such as grooves can well be transferred onto the plate.

The optical recording medium of the present invention need not necessarily be disk-shaped, and may be formed as a card or the like as well.

As described above, the present invention relates to an optical recording medium comprising a center substrate with recesses and/or protrusions formed on at least one of its sides and with recording films formed on both sides of the center substrate, transparent protective plates bonded to the recording films, respectively.

The aforementioned center substrate may possibly be of PC resin made by injection molding.

This center substrate may also be of a synthetic resin made by cast molding.

The aforementioned transparent protective plate may be possibly a PC resin made by extrusion molding.

This transparent protective plate may also be of glass.

Further, the aforementioned center substrate and transparent protective plate may possibly be made of materials similar in thermal expansion coefficient.

Further still, it is also possible to have the aforementioned center substrate made of PC resin by injection molding, while using a extrusion molded PC resin as the aforementioned transparent protective plate.

The method for manufacture of the aforementioned optical recording medium comprises the steps of first making the center substrate having formed recesses and/or protrusions on at least one side thereof, then forming the recording films on both sides of the center substrate and thereafter bonding the transparent protective plates to the recording films respectively.

In the aforementioned process for manufacture of the optical recording substrate the recesses and/or protrusions may possibly be formed on both sides of the center substrate by means of a pair of stampers attached to the die in the course of injection molding.

In the aforementioned manufacturing process the recesses and/or protrusions may also be formed on both sides of the center substrate by first by preparing a material plate by extrusion molding, then placing it between a pair of dies and pressing inward from both sides.

This way, it is possible to obtain a highly reliable optical recording medium, which is prevented from warping of the substrates constituting the optical recording medium, and thus safe from exfoliation of the recording film or the like, even when the optical recording medium is subjected to sudden changes in temperature or the like.

Further, in selecting the transparent protective plate, emphasis may be placed on the optical performance and protective effect required of a transparent protective plate regardless of the ease of forming recesses and/or protrusions such as grooves, hence a marked improvement in carrier-to-noise ratio, isotropy and the like can well be achieved.

Further still, the relative positional precision of the recesses and/or protrusions formed on both sides of the center substrate can be easily improved.

The foregoing descriptions have been to the preferred embodiments of the present invention, which are considered to be merely illustrative of the principles of the present invention and not limiting of the true scope of the present invention. Various modifications and equivalent applications of the concepts of the present invention will occur to those of ordinary skill in the art without departing from the true scope of the present invention as set forth in the following claims.

What is claimed is:

1. An optical recording medium comprising:
    a center substrate;
    said center substrate having either recesses or protrusions formed on both sides of said center substrate;
    a first recording film formed on one side of said center substrate;
    a second recording film formed on a side of said center substrate opposite said first recording film;
    a first adhesive layer formed on said first recording film;
    a second adhesive layer formed on said second recording film;
    a first transparent protective plate formed on said first adhesive layer, said first transparent protective plate being a substantially planar surface of both sides; and
    a second transparent protective plate formed on said second adhesive layer, said second transparent protective plate being a substantially planar surface on both sides.

2. The optical recording medium as claimed in claim 1, further comprising:
    an ultraviolet ray hardening resin placed between said first and second recording film and said first and second transparent protective plates to bond said first and second transparent protective plates to said first and second recording films, respectively.

3. The optical recording medium as claimed in claim 1, wherein said center substrate is a polycarbonate resin formed by injection molding.

4. The optical recording medium as claimed in claim 1, wherein said center substrate is a synthetic resin formed by cast molding.

5. The optical recording medium as claimed in claim 1, wherein said first and second transparent protective plates are polycarbonate resin formed by extrusion molding.

6. The optical recording medium as claimed in claim 1, wherein said first and second transparent protective plates are glass.

7. The optical recording medium as claimed in claim 1, wherein said center substrate and said first and second transparent protective plates are made from materials having similar thermal expansion coefficients.

8. The optical recording medium as claimed in claim 7, wherein said center substrate is a polycarbonate resin formed by injection molding, while said first and second transparent protective plates are polycarbonate resin formed by extrusion molding.

9. An optical recording medium comprising:
a substrate;
said substrate having either recesesses or protrusion formed thereon;
a recording film formed on said substrate;
an adhesive layer formed on said recording film; and
a transparent protective plate formed on said adhesive layer, said transparent protective plate being a substantially planar, surface, wherein transparent protective plate is polycarbonate resin formed by extrusion molding.

10. The optical recording medium as claimed in claim 9, wherein said center substrate is a polycarbonate resin formed by injection molding.

11. The optical recording medium as claimed in claim 9, wherein said center substrate is a synthetic resin formed by cast molding.

12. The optical recording medium as claimed in claim 9, wherein said center substrate and said transparent protective plates are made from materials having similar thermal expansion coefficients.

13. The optical recording medium as claimed in claim 12, wherein said substrate is a polycarbonate resin formed by injection molding, and said transparent protective plates are polycarbonate resin formed by extrusion molding.

* * * * *